(12) United States Patent
Anderson et al.

(10) Patent No.: US 7,544,148 B2
(45) Date of Patent: *Jun. 9, 2009

(54) SYSTEM AND METHOD FOR CONTROLLING VEHICLE SPEED

(75) Inventors: Michael D. Anderson, East Peoria, IL (US); Danial P. Simon, East Peoria, IL (US); Igor Strashny, Grenoble (FR)

(73) Assignee: Caterpillar Inc., Peoria, IL (US)

( * ) Notice: Subject to any disclaimer, the term of this patent is extended or adjusted under 35 U.S.C. 154(b) by 155 days.

This patent is subject to a terminal disclaimer.

(21) Appl. No.: 11/316,894

(22) Filed: Dec. 27, 2005

(65) Prior Publication Data

US 2007/0149350 A1    Jun. 28, 2007

(51) Int. Cl.
*B60W 10/04* (2006.01)

(52) U.S. Cl. .......................... 477/108; 477/54; 477/91; 477/110

(58) Field of Classification Search ................. None
See application file for complete search history.

(56) References Cited

U.S. PATENT DOCUMENTS

| | | | |
|---|---|---|---|
| 4,721,018 A | 1/1988 | Harada et al. |
| 4,740,898 A | 4/1988 | McKee et al. |
| 4,864,894 A | 9/1989 | Falzoni |
| 5,142,928 A | 9/1992 | Buti et al. |
| 5,406,483 A | 4/1995 | Kallis et al. |
| 5,520,588 A | 5/1996 | Hall, III |
| 5,520,591 A | 5/1996 | Hohnstein |
| 5,527,232 A | 6/1996 | Seidel et al. |
| 5,553,453 A | 9/1996 | Coutant et al. |
| 5,560,203 A | 10/1996 | Pollman |
| 5,890,991 A | 4/1999 | Sakakiyama |
| 5,924,955 A | 7/1999 | Ishii et al. |
| 6,080,074 A | 6/2000 | Ulbrich et al. |

(Continued)

FOREIGN PATENT DOCUMENTS

EP    0 270 197    6/1988

(Continued)

OTHER PUBLICATIONS

Ibamoto et al. "Advanced Technology of Transmission Control". Hitachi Review, vol. 39, #5, Oct. 1, 1990 pp. 307-312, XP000219781 ISSN: 0018-277X.

(Continued)

*Primary Examiner*—David D. Le
(74) *Attorney, Agent, or Firm*—Finnegan, Henderson, Farabow, Garrett & Dunner; Richard K. C. Chang, II (57) ABSTRACT

A system is provided for controlling the speed of a vehicle having a powertrain including a power plant operably coupled to a transmission. The system includes a control unit configured to receive a signal indicative of vehicle speed, receive a signal indicative of power plant output speed, and determine a desired power plant output speed based on the signal indicative of vehicle speed and the signal indicative of power plant output speed. The control unit is further configured to send a signal to the power plant such that the power plant operates at the desired power plant output speed, and maintain a desired vehicle speed in a manner substantially independent of a magnitude of load on the powertrain.

35 Claims, 5 Drawing Sheets

U.S. PATENT DOCUMENTS

| | | | |
|---|---|---|---|
| 6,157,884 | A | 12/2000 | Narita et al. |
| 6,183,390 | B1 | 2/2001 | Koga |
| 6,246,940 | B1 | 6/2001 | Ochiai et al. |
| 6,247,378 | B1 | 6/2001 | Newendorp et al. |
| 6,350,216 | B1 | 2/2002 | Speicher et al. |
| 6,428,438 | B1 | 8/2002 | Bowen |
| 6,553,302 | B2 | 4/2003 | Goodnight et al. |
| 6,622,075 | B1 | 9/2003 | Reuschel et al. |
| 6,633,805 | B2 | 10/2003 | Burgart et al. |
| 6,671,602 | B1 | 12/2003 | Speicher et al. |
| 6,766,231 | B2 | 7/2004 | Nakagawa et al. |
| 6,845,684 | B2 | 1/2005 | Inaba et al. |
| 6,961,646 | B2 * | 11/2005 | Soliman et al. ............... 701/51 |
| 7,076,355 | B2 * | 7/2006 | Ota et al. ...................... 701/51 |
| 7,107,135 | B2 * | 9/2006 | Soliman et al. ............... 701/55 |
| 2006/0065467 | A1 | 3/2006 | Schuh |
| 2007/0082786 | A1 * | 4/2007 | Strashny et al. ............. 477/115 |

FOREIGN PATENT DOCUMENTS

| | | |
|---|---|---|
| EP | 1172248 | 1/2002 |
| EP | 1 277 610 | 1/2003 |
| JP | 01153862 | 6/1989 |
| JP | 2002168339 | 6/2002 |
| JP | 2005126020 | 5/2005 |

OTHER PUBLICATIONS

English-language Abstract of JP 01153862.
International Search Report issued in International Application No. PCT/US2008/001244 on Jun. 9, 2008.
Igor N.M.I. Strashny, Copending U.S. Appl. No. 11/543,941, filed Oct. 6, 2006 (37 pages).
Norval P. Thomson, Copending U.S. Appl. No. 11/700,196, filed Jan. 31, 2007 (22 pages).
Takeshi et al., Abstract of Japanese Publication No. JP 01153862, dated Jun. 16, 1989 (1 page).
Tadashi et al., Abstract of Japanese Publication No. JP 2002168339, dated Jun. 14, 2002 (1 page).
Yoshio et al., Abstract of Japanese Publication No. JP 2005126020, dated May 19, 2005 (1 page).

* cited by examiner

| TRANSMISSION GEAR RATIO | 3-SPEED RANGE (NORMAL) MODE | | | 5-SPEED RANGE (MULTI-SPEED) MODE | | |
|---|---|---|---|---|---|---|
| | SPEED RANGE | DISPLAY | SPEED (MPH) | SPEED RANGE | DISPLAY | SPEED (MPH) |
| 3F | 3 | 3F | 7.4 | 5 | 3.5F | 7.4 |
| | | | | 4 | 3.0F | 5.3 |
| 2F | 2 | 2F | 4.2 | 3 | 2.5F | 4.2 |
| | | | | 2 | 2.0F | 3.2 |
| 1F | 1 | 1F | 2.4 | 1 | 1.5F | 2.4 |
| N | 0 | N | 0 | 0 | N | 0 |
| 1R | -1 | 1R | -3.0 | -1 | 1.5R | -3.0 |
| | | | | -2 | 2.0R | -4.1 |
| 2R | -2 | 2R | -5.2 | -3 | 2.5R | -5.2 |
| | | | | -4 | 3.0R | -6.8 |
| 3R | -3 | 3R | -9.0 | -5 | 3.5R | -9.0 |

*FIG. 4*

SYSTEM AND METHOD FOR CONTROLLING VEHICLE SPEED

TECHNICAL FIELD

The present disclosure relates generally to systems and methods for controlling vehicle speed and, more particularly, to systems and methods for controlling vehicle speed via control of a power plant and/or a transmission of a vehicle.

BACKGROUND

A vehicle may include a power plant for providing power to operate a vehicle and a transmission for converting at least a portion of the power to work in order to propel the vehicle. The speed of the vehicle may be controlled by controlling the output of the vehicle's power plant and/or the by selecting a gear ratio of the vehicle's transmission. For example, a vehicle may include an internal combustion engine configured to operate within a range of engine speeds and a transmission configured to convert the engine speed to an output speed such that the vehicle travels at a speed that varies according to a combination of the engine speed and the ratio of the engine speed to the transmission output speed.

Some vehicles may include, for example, an internal combustion engine and a powershift transmission. For such vehicles, the output of the internal combustion engine may be operably connected to the powershift transmission via, for example, a torque converter configured to transfer power from the internal combustion engine to the input of the powershift transmission. The powershift transmission may include a gear assembly along with one or more clutches for selectively engaging combinations of the gears such that the ratio of the transmission's input speed to output speed may be selected to provide discrete gear ratios.

For some vehicles, such as work machines, it may be desirable to operate the vehicle within predetermined speed ranges. Each of the predetermined speed ranges may generally correlate, for example, to a particular gear ratio engaged in the transmission and a range of engine speeds of the internal combustion engine. For example, the transmission may include gears and clutches that permit the transmission to be engaged in three forward gear ratios and three reverse gear ratios. A vehicle with such a transmission configuration is able to operate in six speed ranges—three forward speed ranges and three reverse speed ranges, each corresponding to an engine speed and one of the six gear ratios. In other words, a vehicle having such a transmission configuration is limited to six speed ranges by virtue of the number of available speed ranges being limited to the number a transmission gear ratios.

One possible drawback of such conventional systems may relate to their lack of ability to provide a vehicle operator with more available speed ranges than the number of gear ratios available in the transmission. Providing more speed ranges than available gear ratios may be desirable, for example, to more closely tailor operation of the vehicle to an operator's preferences. For example, an operator may select a speed range based on considerations, such as, for example, the type of operation being performed by the vehicle (e.g., grading on relatively flat terrain or grading on relatively steep and/or uneven terrain), the condition of the terrain on which the vehicle is traveling, and/or the level of skill of the operator. By providing more available speed ranges than transmission gear ratios, an operator may be able to more closely tailor operations of the vehicle to the operating conditions and/or the operator's skill level. Another possible drawback with conventional systems may relate their inability to control the vehicle's speed as the engine experiences changing loads. It may be desirable to control operation of the engine and/or transmission such that the vehicle substantially maintains a desired speed in a manner substantially independent of the magnitude of the load experienced by the vehicle's powertrain.

An example of a transmission control system for a vehicle having an internal combustion engine and a powershift transmission is described in U.S. Pat. No. 5,526,261 (the '261 patent) issued to Kallis et al. on Jun. 11, 1996. The '261 patent describes a transmission control system including a first electronic controller for providing transmission control signals required to command the powershift transmission to shift and operate in any particular one of its forward gears, and a second electronic controller for providing at least one engine control signal required to command the engine to operate at one of a number of different desired engine speeds and to monitor the actual engine speed. In the '261 patent's system, gear ranges are used that slightly overlap along with a throttle that is infinitely adjustable within a range of engine speeds, such that any given ground speed within the range of possible vehicle speeds can be achieved and maintained, so long as the engine is operating within its overall power envelope.

Although the system described in the '261 patent may control the vehicle's engine speed and powershift transmission's forward gears, the '261 patent's system still suffers from the drawbacks outlined above, such as, for example, an inability to maintain the vehicle's speed as the powertrain experiences changing loads.

The disclosed systems and methods for controlling vehicle speed are directed to overcoming one or more of the drawbacks set forth above.

SUMMARY OF THE INVENTION

In one aspect, the present disclosure includes a system for controlling the speed of a vehicle having a powertrain including a power plant operably coupled to a transmission. The system includes a control unit configured to receive a signal indicative of vehicle speed, receive a signal indicative of power plant output speed, and determine a desired power plant output speed based on the signal indicative of vehicle speed and the signal indicative of power plant output speed. The control unit is further configured to send a signal to the power plant such that the power plant operates at the desired power plant output speed, and maintain a desired vehicle speed in a manner substantially independent of a magnitude of load on the powertrain.

In a further aspect, the present disclosure includes a vehicle having a powertrain. The vehicle includes a power plant configured to provide power to the vehicle, and a transmission operably coupled to the power plant. The transmission is configured to transfer the power provided by the power plant to propel the vehicle. The vehicle further includes driving members configured to propel the vehicle, and a control unit configured to control operation of the power plant and the transmission. The control unit is configured to receive a signal indicative of vehicle speed, receive a signal indicative of power plant output speed, and determine a desired power plant output speed based on the signal indicative of vehicle speed and the signal indicative of power plant output speed. The control unit is further configured to send a signal to the power plant such that the power plant operates at the desired power plant output speed, and maintain a desired vehicle speed in a manner substantially independent of a magnitude of load on the powertrain.

In still a further aspect, the present disclosure includes a method for controlling the speed of a vehicle having a powertrain including a power plant and a transmission. The method includes sensing a signal indicative of vehicle speed, sensing a signal indicative of power plant output speed, and determining a desired power plant output speed based on the signal indicative of vehicle speed and the signal indicative of power plant output speed. The method further includes sending a signal to the power plant such that the power plant operates at the desired power plant output speed, and maintaining a desired vehicle speed in a manner substantially independent of a magnitude of load on the powertrain.

DETAILED DESCRIPTION

Figure 1:
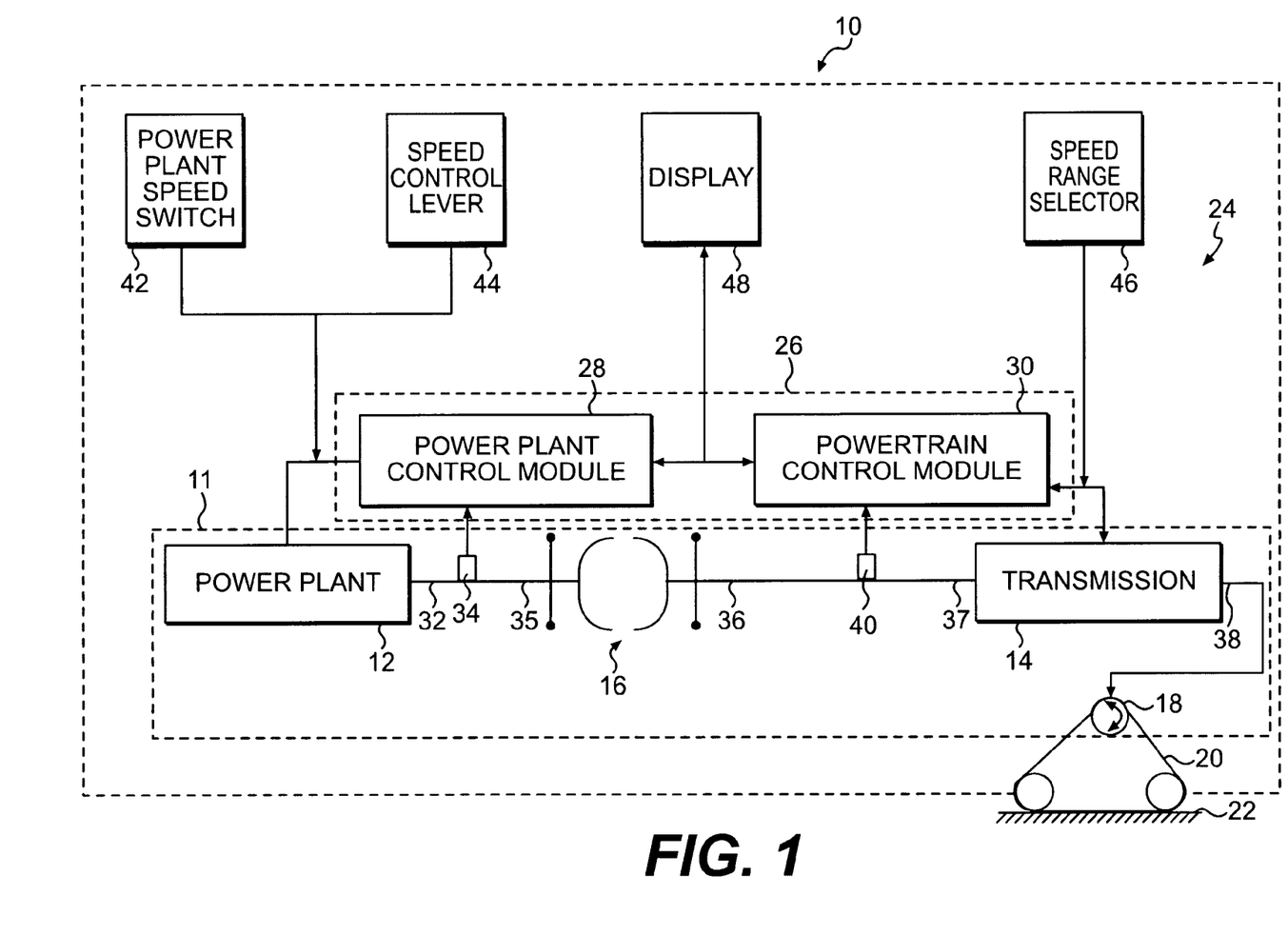
FIG. 1 is a schematic block diagram of an exemplary vehicle, including an exemplary embodiment of a system for controlling the speed of the vehicle.

FIG. 1 schematically depicts an exemplary vehicle 10, including a powertrain 11 having a power plant 12 and a transmission 14 operably coupled to the power plant 12 via, for example, a torque converter 16. The output of transmission 14 may be operably coupled to one or more driving members 18 configured to provide power to one or more ground engaging tracks 20 for propelling vehicle 10 across terrain 22.

Power plant 12 may be an internal combustion engine, such as, for example, a spark-ignition engine or a compression-ignition such as a diesel engine. The use of other power plants known to those skilled in the art is contemplated. Transmission 14 may be a powershift transmission and may include a gear assembly and one or more clutch assemblies configured to provide a plurality of forward and/or reverse gear ratios that correlate to a ratio of the input speed of transmission 14 to the output speed of transmission 14. For example, transmission 14 may include one or more planetary gear trains and one or more clutches configured to selectively engage such that transmission 14 provides a plurality of forward and/or reverse gear ratios. Other types of transmissions known to those skilled in the art may be used.

The exemplary vehicle 10 schematically depicted in FIG. 1 is propelled via one or more ground engaging tracks 20. Vehicle 10 may be, for example, a track-type tractor, such as a dozer, a track-type loader, a hydraulic excavator, or any other vehicle known to those skilled in the art as having one or more ground engaging tracks. Furthermore, although vehicle 10 is depicted as including ground engaging track(s) 20, this disclosure is not limited to vehicles having ground engaging tracks. For example, vehicle 10 may be a vehicle configured to be propelled via one or more wheels, such as, for example, a wheel loader.

Vehicle 10 may include a system 24 for controlling vehicle speed. For example, system 24 may be configured provide an operator of vehicle 10 with the ability to select a speed range for vehicle 10's travel from among a plurality of available speed ranges. The number of speed ranges available for selection may be greater than, for example, the number of forward and/or reverse gear ratios of transmission 14. For example, transmission 14 may include a gear assembly and one or more clutches configured to provide three forward gear ratios and three reverse gear ratios, which generally provide six speed ranges—one speed range corresponding to each gear ratio. According to some embodiments, system 24 may be configured to provide more speed ranges than the number of gear ratios available in transmission 14. For example, system 24 may be configured to provide two or more speed ranges for one or more of the gear ratios of transmission 14.

System 24 may include a control unit 26, which may include a power plant control module 28 and a powertrain control module 30. Although the exemplary embodiment schematically depicted in FIG. 1 shows the power plant control module 28 and powertrain control module 30 as separate elements, power plant control module 28 and powertrain control module 30 are not necessarily separate from one another.

Power plant control module 28 may be operably coupled to power plant 12 and powertrain control module 30. Power plant control module 28 may be configured to control operation of power plant 12. For example, power plant control module 28 may be configured to control power output and/or output speed of power plant 12, for example, at power plant output shaft 32 by sending control signals to power plant 12. Further, power plant control module 28 may be configured to receive signals from a sensor 34 indicative of power plant 12's power output and/or speed output.

Torque converter 16 may include a torque converter input shaft 35 operably connected to power plant output shaft 32 and a torque converter output shaft 36 operably coupled to an input shaft 37 of transmission 14. Torque converter 16 may provide a viscous coupling between torque converter input shaft 35 and torque converter output shaft 36, such that, for example, torque from torque converter input shaft 35 and torque converter output shaft 36 may be transferred to one another in a fashion relatively free from abrupt shocks. Due to the viscous coupling, torque converter input shaft 35 and torque converter output shaft 36 generally do not have the same rotational speed. For example, the viscous coupling may result in a transfer of torque between torque converter input shaft 35 and torque converter output shaft 36, such that a speed ratio of torque converter input shaft 35's rotational speed to torque converter output shaft 36's rotational speed ranges from about 0 to about 1.1. For example, as the rotational speed of torque converter input shaft 35 increases via torque provided by power plant output shaft 32, the viscous coupling of torque converter 16 tends to increase the rotational speed of torque converter output shaft 36, for example, until such time as the rotational speed of torque converter output shaft 36 approaches the rotational speed of torque converter input shaft 35 (i.e., when torque converter output shaft 36 is either experiencing no load or a relatively small load through transmission 14). Further, as a load on powertrain 11 increases, for example, when vehicle 10 travels uphill or pulls a heavy load, the load is transferred through transmission 14 and transmission input shaft 37 to torque converter output shaft 36, thereby tending to reduce the rotational speed of torque converter output shaft 36. Torque converter output shaft 36 transfers a negative torque (i.e., by virtue its reduced rotational speed) through the viscous coupling of torque converter 16 to torque converter input shaft 35, which tends to slow the rotational speed of torque converter input shaft 35. In this manner, torque is transferred through powertrain 11 back to power plant 12, which, in turn, may lug as a result of the negative torque transmitted though torque converter 16.

Powertrain control module 30 may be operably coupled to transmission 14 and power plant control module 28. Powertrain control module 30 may be configured to control operation of transmission 14. For example, powertrain control module may be configured to control the ratio of the speed of transmission 14's input shaft 37 to the speed of transmission 14's output shaft 38, for example, by sending control signals to transmission 14 such that one or more clutches of transmission 14 are engaged to result in a particular gear ratio. Further, powertrain control module 30 may be configured to receive signals from a sensor 40 indicative of the speed at which vehicle 10 travels across terrain 22, for example, a signal indicative of the speed of torque converter output shaft 36, which may, in turn, correlate to vehicle 10's speed. According to some embodiments, the speed at which vehicle 10 travels across terrain 22 may be determined via, for example, a radar system and/or a global positioning system, or via any other system and/or method known to those having skill in the art.

System 24 may further include a power plant speed switch 42 operably coupled to power plant 12 and/or control unit 26. For example, power plant speed switch 42 may be operably coupled to power plant control module 28 and may be configured to selectively change the modes of operation of system 24 between a normal mode and a multi-speed mode for controlling vehicle speed via manual control. For example, when system 24 is operating in the normal mode, an operator of vehicle 10 may be provided with a number speed ranges equal to the number of forward and/or reverse gear ratios provided by transmission 14. When system 24 is operating in the multi-speed mode, system 24 may provide an operator of vehicle 10 with a number of speed ranges greater than the number of forward and/or reverse gear ratios provided by transmission 14. For example, when system 24 is operating in the multi-speed mode, an operator of vehicle 10 may be provided with more forward speed ranges than the number of forward gear ratios provided by transmission 14 and/or with more reverse speed ranges than the number of reverse gear ratios provided by transmission 14. Some embodiments of system 24 may not include power plant speed switch 42, and/or system 24 may always operate in the multi-speed mode.

System 24 may also include a speed control lever 44 operably coupled to power plant 10 and/or control unit 26. For example, speed control lever 44 may include a decelerator pedal configured to reduce, for example, the output speed of power plant 12. For example, speed control lever 44 may be configured to provide an operator with the ability to reduce the output speed of power plant output shaft 32, for example, when the operator desires to reverse vehicle 10's direction of travel and/or if vehicle 10 is operating in a relatively confined area.

System 24 may further include a speed range selector 46 operably coupled to control unit 26 and/or transmission 14. For example, speed range selector 46 may be operably coupled to powertrain control module 30 and may be configured to select a speed range for controlling the speed of vehicle 10. For example, speed range selector may include one or more switches or buttons for manually selecting a speed range corresponding to a speed at which vehicle 10 will travel. According to some exemplary embodiments, speed range selector 46 includes two buttons—one for selecting a higher speed range and one for selecting a lower speed range. By depressing the button for selecting a higher speed range, the selected speed range sequentially increases (e.g., the speed range increases from a first speed range to a second relatively faster speed range). According to some embodiments, if the button for selecting a higher speed range is depressed and held in the depressed position, the selected speed range will sequentially increase until either a desired speed range is achieved or a maximum speed range is selected (e.g., the selected speed range will increase from a first speed range, to a second speed range, and so on, until the maximum speed range is selected). Conversely, by depressing the button for selecting a lower speed range, the selected speed range sequentially decreases (e.g., the speed range decrease from a second speed range to a first relatively slower speed range). Furthermore, according to some embodiments, if the button for selecting a lower speed range is depressed and held in the depressed position, the selected speed range will sequentially decrease until either a desired speed range is achieved or the minimum speed range is selected (e.g., the selected speed range will decreases from a third speed range, to a second speed range, and so on, until the minimum speed range is selected).

According to some embodiments, system 24 may include a manual adjustment for providing an operator with an ability to manually preset one or more speed ranges associated with one or more of the gear ratios of transmission 14. For example, system 24 may include a default setting corresponding to the fourth forward speed range (e.g., corresponding to the third forward gear ratio), such that vehicle 10, operating with substantially no load acting on powertrain 11, travels at about 4.2 mph. The manual adjustment provides an operator with the ability to change the default setting and/or manually preset the fourth forward speed range, such that vehicle 10 travels at, for example, about 3.8 mph instead of 4.2 mph in the fourth forward speed range.

Vehicle 10 may include a display 48 configured to provide an operator with information about the operation various components of vehicle 10. For example, display 48 may be operably coupled to control unit 26 and may be configured to display information related to the output of power plant 12, the selected speed range, and/or the gear ratio currently engaged in transmission 14.

For example, according to the exemplary embodiment of display 48 schematically depicted in FIGS. 2A-2F and FIGS. 3A-3C, display 46 may include a display panel 50 including an information read-out region 52 and an information identifier region 54. Information read-out region 52 may include LED and/or LCD components configured to provide alphanumeric information. Information identifier region 54 may include representations indicative of the meaning of information provided by information read-out region 52.

For example, information read-out region 52 may include a power plant output portion 56 configured to display the output speed of power plant 12; for example, the rotational speed of power plant output shaft 32 in revolutions per minute (rpm). Information read-out region 52 may further include a gear ratio/speed range mode display portion 58 configured to display the current gear ratio engaged in transmission 14, the current speed range mode selected, and/or the current direction of transmission gear ratio (i.e., forward direction or reverse direction).

Referring to FIGS. 2A-2F, the exemplary display 48 includes a gear ratio/speed range mode display portion 58, which includes regions 60, 62, and 64, respectively corresponding to information related to the current gear ratio engaged in transmission 14, the current speed range mode, and the current direction of transmission gear ratio when the system 24 for controlling vehicle speed is operating in the multi-speed mode.

Figure 3A:
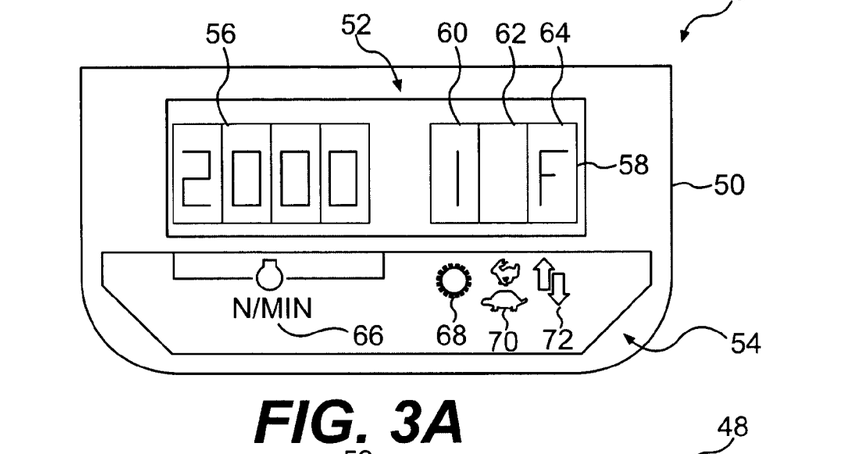
FIG. 3A is a schematic representation of an exemplary embodiment of a display indicating another vehicle status.
Figure 3B:
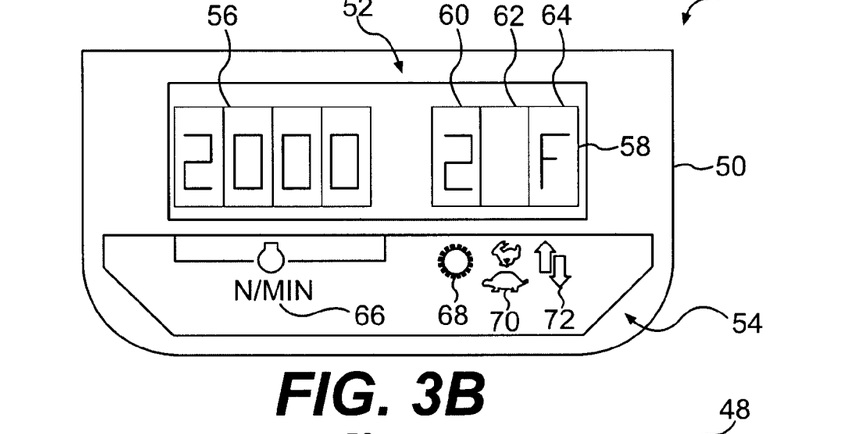
FIG. 3B is a schematic representation of an exemplary embodiment of a display indicating a further vehicle status.
Figure 3C:
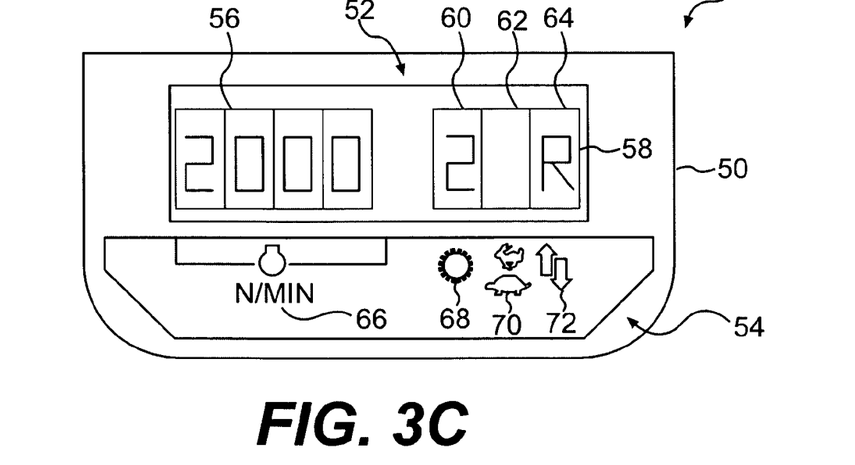
FIG. 3C is a schematic representation of an exemplary embodiment of a display indicating yet another vehicle status.

Referring to FIGS. 3A-3C, the exemplary display 48 includes a gear ratio/speed range mode display portion 58, which includes regions 60 and 64, respectively corresponding to information related to the current gear ratio engaged in transmission 14 and the current direction of transmission gear ratio when the system 24 for controlling vehicle speed is operating in the normal mode. The region 62 may be configured to remain blank when system 24 is operating in the normal mode.

Information identifier region 54 may include representations indicative of the meaning of information provided by information read-out region 52. For example, information identifier region 54 may include one or more symbols 66 configured to be indicative to an operator that information displayed in power plant output portion 56 relates to the output speed of power plant 12. Further, display 48 may include one or more symbols 68 configured to be indicative to an operator that information displayed in region 60 relates to a current gear ratio of transmission 14. For example, symbol 68 may be a representation of a gear or any other symbol tending to indicate a gear ratio and/or transmission. Display 48 may further include one or more symbols 70 configured to be indicative to an operator that information displayed in region 62 relates to the current speed range mode of system 24. For example, symbol 70 may include a representation of a turtle and/or a rabbit, or any other symbol tending to indicate a change in speed and/or mode of operation. Display 48 may also include one or more symbols 72 configured to be indicative to an operator that information displayed in region 64 relates to the current direction of the gear ratio of transmission 14. For example, symbol 72 may include a representation of arrows pointing in opposite directions or any other symbol tending to indicate direction and/or direction change.

Although the exemplary embodiments of display 48 schematically depicted in FIGS. 2A-3C display information related to the output of power plant 12, the selected speed range, and the gear ratio currently engaged in transmission 14 on a single display panel 50, some of this information may be displayed on one or more display panels that are separate from display panel 50 (either in addition to being displayed on display panel 50 or instead of being displayed on display panel 50).

INDUSTRIAL APPLICABILITY

The disclosed systems and methods for controlling vehicle speed may be used to selectively provide an operator with more speed ranges than the number of gear ratios available in a vehicle's transmission. This may allow an operator of the vehicle to more closely tailor the performance of the vehicle to the conditions under which the vehicle is operating, such as, for example, the type of operation being performed by the vehicle (e.g., grading on relatively flat terrain or grading on relatively steep and/or uneven terrain), the condition of the terrain on which the vehicle is traveling, and/or the level of skill of the operator.

In the following description of exemplary embodiments of this disclosure, vehicle 10 includes a pair of ground engaging tracks 20. Exemplary embodiments disclosed are not limited to use with vehicles having ground engaging tracks and may be used with, for example, wheeled vehicles.

According to some embodiments, vehicle 10 may include a power plant speed switch 42 configured to provide an operator with the ability to manually select between normal and multi-speed modes of operation for controlling vehicle speed. According to some embodiments, system 24 may be configured to automatically select between modes of operation based on certain predetermined parameters, such as, for example, maximum and/or minimum power plant output speed. Furthermore, system 24 may be configured to use a combination of normal and multi-speed modes of operation.

When operating in normal mode, system 24 may be configured to provide vehicle 10's operator with a number of speed ranges equal to the number of gear ratios available in transmission 14. For example, vehicle 10 may include a transmission 14, including a gear assembly and one or more clutches configured to provide three forward gear ratios and three reverse gear ratios, thus providing a total of six speed ranges for operation of vehicle 10. Each speed range may correspond to a desired target vehicle speed of travel. For example, for the third forward gear ratio (with system 24 set in normal mode), the speed range may correspond to a target vehicle speed of about 7.4 mph. System 24 may be configured to substantially maintain vehicle 10's speed within a certain range of 7.4 mph (e.g., within about 0.5 mph to about 1 mph of 7.4 mph).

With system 24 set in multi-speed range mode, the operator of vehicle 10 may be provided with a greater number of speed ranges than the number of gear ratios of transmission 14. For example, vehicle 10 may be provided with more than one speed range for one or more of transmission 14's gear ratios.

Figure 4:
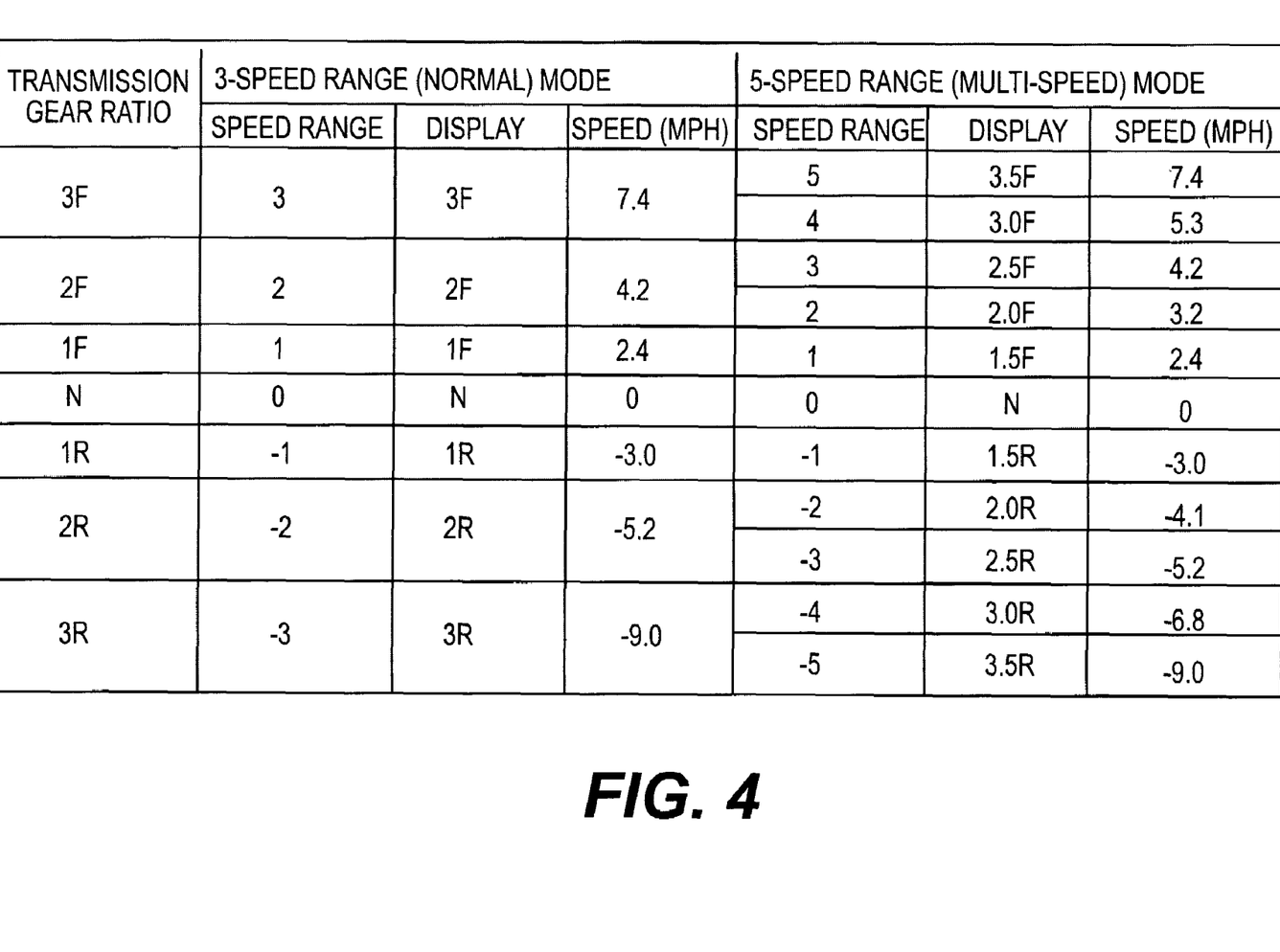
FIG. 4 is table showing exemplary characteristics and modes of operation of an exemplary embodiment of a system for controlling vehicle speed.

For example, as depicted in the table shown in FIG. 4, some embodiments of system 24 may be configured to provide a multi-speed range mode, including a 5-speed range mode for a transmission having three forward gear ratios and three reverse gear ratios. In the exemplary embodiment illustrated in the table of FIG. 4, rather than each of the second and third forward and reverse gear ratios being configured to operate in a single speed range (i.e., when system 24 is operating in the normal mode), system 24 may be configured to operate such that each of the second and third forward and reverse gear ratios may operate in two speed ranges with system 24 operating in the multi-speed range mode. With system 24 operating in the normal mode, second forward gear ratio and third forward gear ratio may each provide a single speed range resulting in a vehicle speeds of, for example, about 4.2 mph and about 7.4 mph, respectively, in the forward direction. In contrast, with system 24 operating in the multi-speed mode, second forward gear ratio and third forward gear ratio may each provide two speed ranges (four speed ranges combined) resulting in vehicle speeds of, for example, about 3.2 mph, about 4.2 mph, about 5.3 mph, and about 7.4 mph, respectively, in the forward direction.

Furthermore, with system 24 operating in the normal mode, second reverse gear ratio and third reverse gear ratio may each provide a single speed range resulting in vehicle speeds of, for example, about 5.2 mph and about 9.0 mph, respectively, in the reverse direction. With system 24 operating in the multi-speed mode, however, second reverse gear ratio and third reverse gear ratio may each provide two reverse speed ranges (four speed ranges combined) resulting in vehicle speeds of, for example, about 4.1 mph, about 5.2 mph, about 6.8 mph, and about 9.0 mph, respectively, in the reverse direction. The vehicle speeds disclosed are merely exemplary, and it is contemplated that other vehicle speeds may be selected to correspond to some or all of the speed ranges.

In this exemplary manner, system 24 maybe configured to provide an operator with, for example, five speed ranges in each direction of vehicle 10's travel, even though vehicle 10 has a transmission 14, which includes three gear ratios for each direction of travel. Furthermore, system 24 may be configured to provide any combination of singular and/or plural speed ranges for one or more of the gear ratios of transmission 14. For example, system 24 may be configured to provide 8 forward speed ranges and 8 reverse speed ranges with a transmission having three forward gear ratios and three reverse gear ratios. This may be accomplished, for example, by providing a single speed range for each of the first forward and first reverse gear ratios, three speed ranges for each of the second forward and second reverse gear ratios, and four speed ranges for each of the third forward and third reverse gear ratios. Furthermore, system 24 may be adapted to provide multiple speed ranges for a transmission having more or fewer than three forward gear ratios and/or more or fewer than three reverse gear ratios; for example, a transmission configured to provide five forward gear ratios and two reverse gear ratios.

Referring to the table depicted in FIG. 4, in the normal mode of operation, system 24 provides a single speed range for each forward and reverse gear ratio, such that a total of six speed ranges are provided. For the exemplary embodiment depicted, speed ranges −3, −2, −1, 1, 2, and 3, correspond respectively to reverse gear ratios 3, 2, and 1, and forward gear ratios 1, 2, and 3. Furthermore, speed ranges −3, −2, −1, 1, 2, and 3 result in vehicle speeds of about −9.0 mph (i.e., about 9.0 mph in the reverse direction), about −5.2 mph, about −3.0 mph, about 2.4 mph, about 4.2 mph, and about 7.4 mph, respectively.

According to some embodiments, vehicle 10 may be provided with a display according to the exemplary displays 48 configured as depicted in FIGS. 2A-2F and 3A-3C. When used in conjunction with an exemplary system 24 configured to operate in manner corresponding to the table depicted in FIG. 4, for example, display 48 may provide an operator with information relating to the output speed of power plant 12 in power plant output portion 56, the current gear ratio engaged in transmission 14 in region 60, and/or the current direction of travel (i.e., forward or reverse) in region 64. Power plant output portion 56 and regions 60, 62, and 64 may be located on display panel 50 adjacent symbols 66, 68, 70, and 72, respectively.

For example, as schematically-depicted in FIG. 3A, with system 24 operating in the normal mode (e.g., 3-speed range mode), when the first forward gear ratio of transmission 14 is engaged, region 60 of display 48 shows "1," denoting that the first gear ratio of transmission 14 is engaged. Further, region 64 shows an "F," denoting that the gear ratio engaged is a forward gear ratio. In the normal mode, as system 24 changes speed ranges, regions 60 and 64 change to reflect the current gear ratio and direction of travel. For example, display 48 shown in FIG. 3B indicates that the second gear ratio in transmission 14 is engaged (as denoted by display of "2" in region 60) and that vehicle 10 is traveling in the forward direction (as denoted by display of "F" in region 64). Similarly, display 48 shown in FIG. 3C indicates that the second gear ratio in transmission 14 is engaged (as denoted by display of "2" in region 60). In contrast to FIG. 3B, display 48 shown in FIG. 3C indicates that vehicle 10 is traveling in the reverse direction rather than the forward direction (as denoted by display of "R" in region 64).

In the multi-speed mode of operation, system 24 may provide a single speed range for the first forward and reverse gear ratios of transmission 14, and two speed ranges for each of the second and third forward and reverse gear ratios, such that a total of ten speed ranges are provided—five forward speed ranges and five reverse speed ranges. For the exemplary embodiment depicted, speed ranges −5 and −4 correspond to the third reverse gear ratio; speed ranges −3 and −2 correspond to the second reverse gear ratio; speed ranges −1 and 1 correspond to the first reverse and first forward gear ratios, respectively; speed ranges 2 and 3 correspond to the second forward gear ratio; and speed ranges 4 and 5 correspond to the third forward gear ratio. Furthermore, speed ranges −5, −4, −3, −2, −1, 1, 2, 3, 4, and 5 result, respectively, in vehicle speeds of about −9.0 mph (i.e., about 9.0 mph in the reverse direction), about −6.8 mph, about −5.2 mph, about −4.1 mph, about −3.0 mph, about 2.4 mph, about 3.2 mph, about 4.2 mph, about 5.3 mph, and about 7.4 mph. As is apparent from the closer relationship between the vehicle speeds corresponding to adjacent speed ranges in the multi-speed mode, an operator of vehicle 10 may be able to more closely tailor operation of vehicle 10 to the conditions (e.g., the operation environment and/or type of operation) under which vehicle 10 is operating.

According to some exemplary embodiments, display 48 may be configured to be used in conjunction with system 24 when operating in multi-speed mode (e.g., 5-speed range mode). For example, display 48 may provide an operator with information relating to the output speed of power plant 12 in power plant output portion 56, the current gear ratio engaged in transmission 14 in region 60, information relating to current speed range in region 62, and/or the current direction of travel (i.e., forward or reverse) in region 64. Power plant output portion 56, and regions 60, 62, and 64 may be located on display panel 50 adjacent symbols 66, 68, 70, and 72, respectively.

Figure 2A:
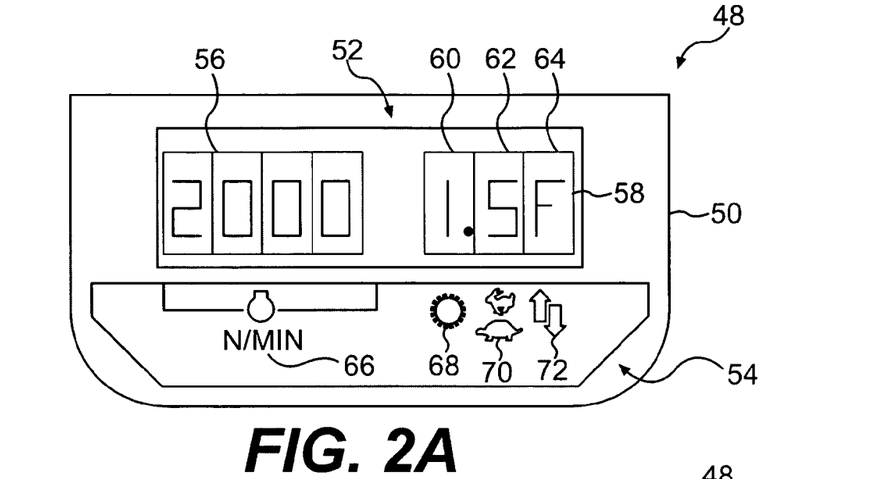
FIG. 2A is a schematic representation of an exemplary embodiment of a display indicating a first vehicle status.
Figure 2B:
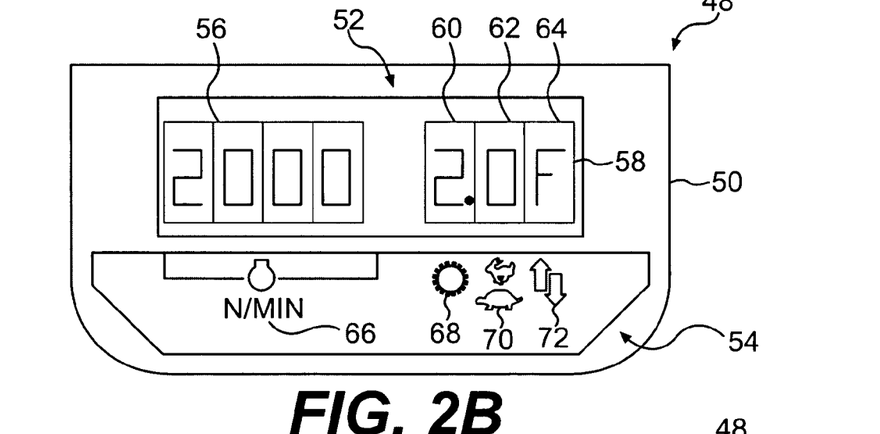
FIG. 2B is a schematic representation of an exemplary embodiment of a display indicating a further vehicle status.
Figure 2C:
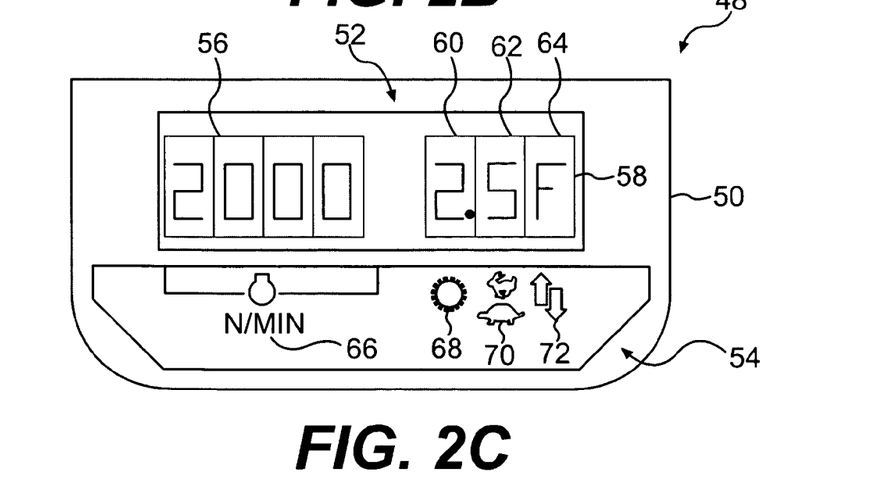
FIG. 2C is a schematic representation of an exemplary embodiment of a display indicating another vehicle status.
Figure 2D:
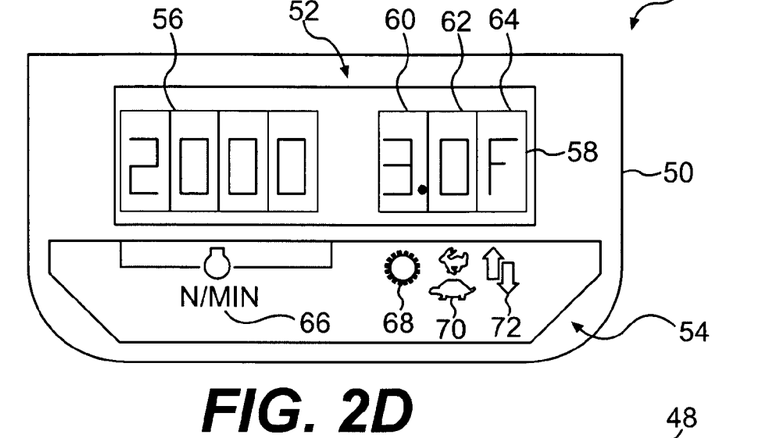
FIG. 2D is a schematic representation of an exemplary embodiment of a display indicating still a further vehicle status.

For example, as schematically-depicted in FIG. 2A with system 24 operating in multi-speed mode, when the first forward gear ratio of transmission 14 is engaged, region 60 of display 48 shows "1," denoting that the first gear ratio of transmission 14 is engaged. In addition, region 62 may be configured to display "5," denoting that system 24 is operating in multi-speed mode within the first gear ratio. Further, region 64 shows an "F," denoting that the gear ratio engaged is a forward gear ratio.

Figure 2E:
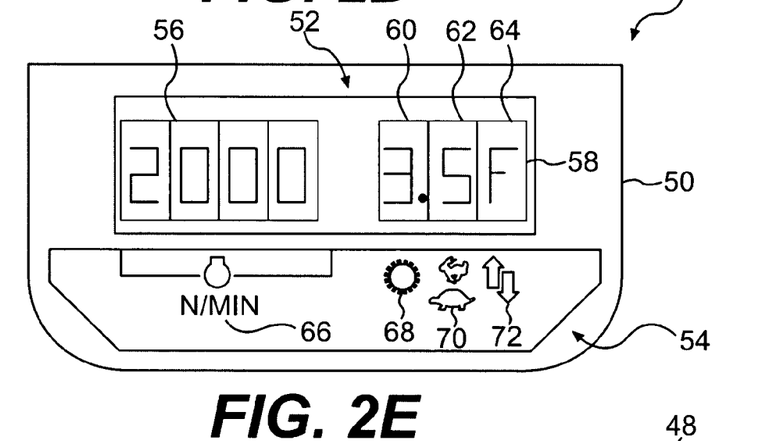
FIG. 2E is a schematic representation of an exemplary embodiment of a display indicating yet another vehicle status.
Figure 2F:
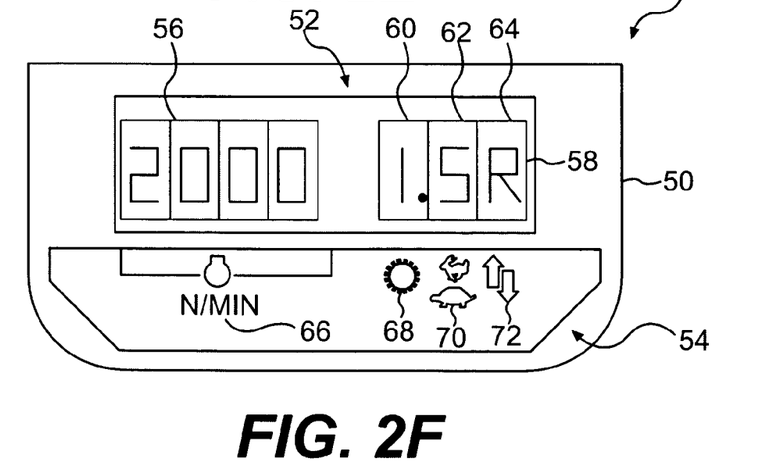
FIG. 2F is a schematic representation of an exemplary embodiment of a display indicating yet a further vehicle status.

In the multi-speed mode of operation, as system 24 changes speed ranges, regions 60, 62, and 64 change to reflect the current gear ratio, the current speed range within the current gear ratio, and direction of travel, respectively. For example, display 48 shown in FIG. 2B indicates that the second gear ratio in transmission 14 is engaged (as denoted by display of "2" in region 60); that the multi-speed mode is activated and that the first speed range within the second gear ratio is currently operating (as denoted by display of "0" in region 62); and that vehicle 10 is traveling in the forward direction (as denoted by display of "F" in region 64). Display 48 shown in FIG. 2C indicates that the second gear ratio in transmission 14 is engaged (as denoted by display of "2" in region 60); that the multi-speed mode is activated and that the second speed range within the second gear ratio is currently operating (as denoted by display of "5" in region 62); and that vehicle 10 is traveling in the forward direction (as denoted by display of "F" in region 64). Similarly, display 48 shown in FIG. 2D indicates that the third gear ratio in transmission 14 is engaged (as denoted by display of "3" in region 60); that the multi-speed mode is activated and that the first speed range within the third gear ratio is currently operating (as denoted by display of "0" in region 62); and that vehicle 10 is traveling in the forward direction (as denoted by display of "F" in region 64). As depicted in FIG. 2E, display 48 indicates that the third gear ratio in transmission 14 is engaged (as denoted by display of "3" in region 60); that the multi-speed mode is activated and that the second speed range within the third gear ratio is currently operating (as denoted by display of "5" in region 62); and that vehicle 10 is traveling in the forward direction (as denoted by display of "F" in region 64). Similarly, display 48 shown in FIG. 2F indicates that the first gear ratio in transmission 14 is engaged (as denoted by display of "1" in region 60), and that the multi-speed mode is activated (as denoted by "5" in region 62). Display 48 shown in FIG. 2F, however, indicates that vehicle 10 is traveling in the reverse direction rather than the forward direction (as denoted by display of "R" in region 64).

During operation, an operator of vehicle 10 may control speed of vehicle 10 via operation of speed range selector 46, which may be configured to provide the operator with the ability to select higher and lower speed ranges. For example, an up-shift button or lever may be used for sequentially selecting higher speed ranges upon each depression of the up-shift button, such that system 24 changes speed ranges, for example, from a first speed range, to a second speed range, to a third speed range, and so on, until either an operator-desired speed range or the maximum speed range of system 24 has been selected for the current operation mode (i.e., normal mode or multi-speed mode). Conversely, a down-shift button or lever may be used for sequentially selecting lower speed ranges upon each depression of the down-shift button, such that system 24 changes speed ranges, for example, from a higher speed range to the next lower speed range, and so on, until either an operator-desired speed range or the minimum speed range of system 24 has been selected for the current operation mode. According to some embodiments, by holding either the up-shift or down-shift buttons in a depressed condition, the system 24 will sequentially up-shift or down-shift speed ranges until either an operator-desired speed range has been selected, or a maximum or minimum speed range of system 24 has been selected for the current operation mode.

According to some embodiments, vehicle 10 may include a display 48, for example, as shown in FIGS. 2A-2F and FIGS. 3A-3C, configured to provide the operator with information relating power plant 12's output (e.g., output speed in rpm), the gear ratio currently engaged in transmission 14, which mode of operation system 24 is currently in, which speed range within a particular gear ratio vehicle 10 is operating in, and/or which direction vehicle 10 is traveling in.

For example, as speed range selector 46 is manipulated to change between speed ranges, the gear ratio/speed range mode display portion 58 may be configured to reflect changes in gear ratio, speed range, mode of operation, and/or direction or vehicle travel. FIGS. 2A-2E, for example, depict an exemplary display 48 as the speed ranges increase sequentially in a multi-speed mode of operation. First through fifth forward speed ranges are denoted consecutively by "1.5F," "2.0F," "2.5F," "3.0F," and "3.5F." The "1.5F" designation, for example, denotes that the first forward gear ratio of transmission 14 is engaged and that system 24 is operating in multi-speed mode. The "2.0F" designation denotes that the second forward gear ratio of transmission 14 is engaged, that system 24 is operating in multi-speed mode, and that the first speed range for the second gear ratio is selected. The "2.5F" designation denotes that the second forward gear ratio of transmission 14 is engaged, that system 24 is operating in multi-speed mode, and that the second speed range for the second gear ratio is selected. Display 48 operates in a similar manner for the "3.0F" and "3.5F" designations (see, e.g., FIGS. 2D and 2E). Display 48 may be configured to display information in a similar fashion for reverse speed ranges, for example, with designations such as "1.5R," "2.0R," "2.5R," "3.0R," and "3.5R" (see, e.g., FIG. 2F).

As shown in FIGS. 3A-3C, when system 24 is operating in normal mode, display 48 may display designations such as "1 F," "2 F," and "3 F," which denote operation in normal mode (e.g., by virtue of omission of a "0" or "5" designation in region 62 of display 48), in first, second, and third forward gear ratios, respectively. Display 48 may be configured to display information in a similar fashion for reverse speed ranges, for example, with designations such as "1 R," "2 R," and "3 R" (see, e.g., FIG. 3C).

According to some embodiments, system 24 may be configured to control vehicle 10's speed, such that vehicle 10 operates within a certain range of predetermined speed ranges based on the gear ratio selected in transmission 14 and a desired ground speed in a manner substantially independent of load on power plant 12. For example, system 24 may be configured to determine a desired output speed of power plant 12 (e.g., in rpm) as a function of the gear ratio engaged in transmission 14 and a parameter that correlates to ground speed. The desired power plant output speed for substantially maintaining an operator's desired speed range may be determined based on, for example, the gear ratio engaged in transmission 14 and the output speed of torque converter output shaft 36. For example, sensor 40 may be configured to send a signal to powertrain control module 30 indicative of the output speed of torque converter output shaft 36, and transmission 14 may be configured to send a signal indicative of the gear ratio engaged to powertrain control module 30. Based on these signals, system 24 may be configured to determine a desired power plant output speed (which may be measured, for example, at power plant output shaft 32 via sensor 34), such that vehicle 10 operates at a speed within a range of the selected speed range in a manner substantially independent of the load on power plant 12.

According to some exemplary embodiments, vehicle 10 may include a pair of ground engaging tracks 20, and such vehicles may be used, for example, in environments and/or to perform work that may often result in powertrain 11 being subjected to relatively widely varying loads. For example, a vehicle having ground engaging tracks may operate on terrain having steep inclines. As a result, an operator may maneuver such a vehicle up or down such inclines, which may result in little or no load on powertrain 11 while traveling down hill or which may result in relatively high loads while traveling up hill. Furthermore, vehicles having ground engaging tracks may be used to grade terrain and/or pull heavy objects, which may result in high and/or widely varying loads being placed on powertrain 11.

According to some embodiments, torque converter 16, which operably couples power plant 12 to transmission 14, may be configured to transfer power from power plant 12 to transmission 14 via, for example, a viscous coupling. By virtue of the viscous coupling, the output speed of power plant 12's output shaft 32 may not necessarily be equal to the speed of torque converter output shaft 36. As a result, as vehicle 10 encounters a load due, for example, to traveling up a steep incline or pulling a heavy load, this load may be transferred via transmission 14 to torque converter 16. In order to maintain vehicle 10's speed, power plant 12 must increase its output speed to offset the load transferred by torque converter 16 to power plant 12. Conversely, if vehicle 10 travels down a steep incline, vehicle 10's weight will tend to increase its speed of travel down the incline. The positive load due to the vehicle 10's weight may be transferred via transmission 14 to torque converter 16. In order to maintain vehicle 10's speed, power plant 12 may be controlled to decrease its output speed to offset the positive load transferred to torque converter 16.

According to some embodiments, system 24 may be configured to substantially maintain a desired speed range even when vehicle 10 is subjected to changing loads that might otherwise hasten or slow vehicle 10's speed of travel. For example, system 24 for controlling vehicle speed may be configured to substantially maintain an operator's desired speed range by determining a desired power plant output speed as a function of the gear ratio engaged in transmission 14 and a parameter indicative of vehicle speed, such as, for example, the speed of torque converter output shaft 36. Desired power plant output shaft speed $\omega_{dpp}$ may be determined, for example, according to the following equation:

$$\omega_{dpp} = TCOS_{target} \times (\omega_{actual}/TCOS_{actual});$$

where $TCOS_{target}$ represents a target speed for torque converter output shaft 36, and $TCOS_{actual}$ represents the actual speed of torque converter output shaft 36 (e.g., as measured by sensor 40), and $\omega_{actual}$ represents the actual speed of power plant output shaft 32 (e.g., as measured by sensor 34). The actual speed of torque converter output shaft 36, $TCOS_{actual}$, may be correlated to the actual speed of vehicle 10, and system 24 may set a target torque converter output shaft speed $TCOS_{target}$, such that vehicle 10 maintains a substantially constant desired speed in a manner substantially independent of the load on powertrain 11.

For example, as sensors 34 and 40 respectively provide signals indicative the actual speed of power plant output shaft 32, $\omega_{actual}$, and the actual speed of torque converter output shaft 36, $TCOS_{actual}$, system 24 may determine a desired power plant output shaft speed $\omega_{dpp}$ using the above equation to maintain the target torque converter output shaft speed $TCOS_{target}$. By setting and maintaining the target torque converter output shaft speed $TCOS_{target}$ that corresponds to a desired speed range, the speed of vehicle 10 may be maintained at a substantially constant speed in a manner substantially independent of the load (e.g., independent of load changes) on powertrain 11.

During operation, for example, as a load on powertrain 11 increases, the actual speed of torque converter output shaft 36 may be reduced. Sensor 40 sends a signal indicative of the speed of torque converter output shaft 36 to powertrain control module 30, which results in an increase in the desired power plant output shaft 32's speed to offset the sensed decrease in the speed of the torque converter output shaft 36. In this manner, the power plant 12's output shaft 32 provides torque converter input shaft 35 with more torque (i.e., more torque in the direction of rotation of torque converter output shaft 36) to counteract the increase in load on powertrain 11, such that the vehicle 10's speed is substantially maintained in a manner substantially independent of the magnitude of the load experienced by powertrain 11, so long as power plant 12 can provide enough torque to offset the magnitude of the increased load. If the magnitude of the increased load exceeds a value at which power plant 12 is able to provide sufficient torque to counteract the load, the vehicle 10's speed may decline.

If, on the other hand, the load on powertrain 11 is decreased, the speed of torque converter output shaft 36 may increase. For example, as vehicle 10 travels down an incline, vehicle 10's weight may tend to increase the speed of torque converter output shaft 36's speed via torque transferred through transmission 14. In response, sensor 40 sends a signal indicative of the speed of torque converter output shaft 36 to powertrain control module 30, which results in a decrease in desired power plant output shaft 32's speed to offset the increase in the speed of torque converter output shaft 36. In this manner, the power plant 12's output shaft 32 provides torque converter input shaft 35 with less torque (i.e., torque in a direction opposite to the direction of rotation of the torque converter output shaft 36's rotation) to counteract the decrease in load on powertrain 11, such that the vehicle 10's speed is maintained in a manner substantially independent of the magnitude of the load experienced by powertrain 11.

According to some embodiments, parameters that correlate to vehicle speed other than torque converter output shaft speed may be measured, such as, for example, the speed of driving member(s) 18, and/or the speed of ground engaging tracks 20. According to some embodiments, vehicle speed may be determined via global positioning systems and/or via vehicle-mounted radar systems that measure vehicle speed.

During operation of vehicle 10 including some embodiments of system 24 for controlling vehicle speed, an operator may select either a normal mode of operation or a multi-speed mode of operation for system 24, for example, via power plant speed switch 42. If the operator selects the normal mode, system 24 will provide the operator with a number of speed ranges equal to the number of gear ratios available from transmission 14, and the operator may select a desired speed range via speed range selector 46. For example, the operator may depress an up-shift or down-shift button until the desired speed range is selected, which the operator may determine via display 48 (see, e.g., FIGS. 3A-3C). Once the desired speed range has been selected, system 24 will control vehicle 10's speed such that it travels within a certain range of a particular speed associated with the selected speed range. For example, system 24 may be configured such that once a desired speed range has been selected, vehicle 10 travels within, for example, about one mph of a target vehicle speed associated with the selected speed range. Further, system 24 may be configured such that vehicle 10 travels within a certain range of the target vehicle speed regardless of the load placed on powertrain 11, for example, so long as power plant 12 is capable of substantially maintaining the target speed.

If, on the other hand, the operator selects the multi-speed mode, system 24 will provide the operator with a greater number of speed ranges than the number of gear ratios available from transmission 14, and the operator may select a desired speed range via speed range selector 46. The operator may depress an up-shift or down-shift button until the desired speed range is selected, which the operator may determine via display 48 (see, e.g., FIGS. 2A-2F). Once the desired speed range has been selected, system 24 will control vehicle 10's speed such that it travels within a certain range of a particular speed associated with the selected speed range. System 24 may, for example, be configured such that once a desired speed range has been selected, vehicle 10 travels within about one mph of a target vehicle speed associated with the selected speed range. Further, system 24 may be configured such that vehicle 10 travels within a certain range of the target vehicle speed substantially independent of the load placed on powertrain 11, for example, so long as power plant 12 is capable of substantially maintaining the target vehicle speed.

According to some embodiments, vehicle 10 may include speed control lever 44, which may be, for example, a decelerator pedal. Speed control lever 44 may be used to reduce the output speed of power plant 12, for example, prior to reversing the direction of vehicle 10's travel. For example, if vehicle 10 is a work machine, which may often cycle between travel in the forward direction and travel in the reverse direction, speed control lever 44 may be operated (e.g., depressed) such that the speed of power plant 12 is reduced prior to reversing direction. Further, speed control lever 44 may be operated to reduce power plant 12's output speed to render it easier to maneuver vehicle 10 in a relatively confined area.

Some embodiments may include an autoshift function configured to provide an operator with the ability to pre-select gear ratios and/or speed range settings upon switching directions of vehicle travel between a forward direction of travel and a reverse direction of travel. For example, in a vehicle 10 that may be operated such that it cycles between a forward direction of travel and a reverse direction of travel, the autoshift may allow the operator to pre-select a forward gear ratio and/or speed range setting for automatic selection when the operator switches to a forward direction of travel from a reverse direction of travel and/or to pre-select a reverse gear ratio and/or speed range setting for automatic selection when the operator switches to a forward direction of travel from a reverse direction of travel. For example, the operator can pre-select the second forward gear ratio (e.g., in either the second or third speed range setting) and the first reverse gear ratio, such that when the operator switches from a forward direction of travel to the reverse direction, transmission 14 automatically selects the first reverse gear ratio, and when the operator switches from the reverse direction of travel to the forward direction of travel, transmission 14 automatically selects the second forward gear ratio. These gear ratios are exemplary, and system 24 may be configured such that other gear ratios are pre-selected. According to some embodiments, speed ranges rather than gear ratios may be pre-selected and/or a combination of speed ranges and gear ratios may be pre-selected (e.g., the fourth forward speed range and the third reverse gear ratio may be pre-selected).

According to some embodiments, vehicle 10 may include a system for automatically downshifting transmission 14 to a lower gear ratio, for example, if vehicle 10's speed of travel falls below a certain speed. Such systems may be used to increase productivity and/or may prevent power plant 12 from experiencing an underspeed condition that might lead to lugging.

Some embodiments of a system for automatically downshifting may be provided with two or more settings, which trigger the automatic downshift. For example, such a system may include a high setting and a low setting. When operating in the high setting, the downshift may occur at a higher vehicle speed than when the system is operating in the low setting for a particular gear ratio (i.e., the downshift may occur in response to relatively smaller decreases in vehicle speed). According to some embodiments, the amount of vehicle speed reduction for a downshift may be selected by the operator and/or may be automatically set by system 24. According to some embodiments, the system for automatically downshifting may be manually activated and/or deactivated by the vehicle operator.

Other embodiments of the disclosure will be apparent to those skilled in the art from consideration of the specification and practice of the embodiments disclosed herein. It is intended that the specification and examples be considered as exemplary only, with a true scope of the invention being indicated by the following claims.

What is claimed is:

1. A system for controlling the speed of a vehicle having a powertrain including a power plant operably coupled to a transmission via a torque converter including an output shaft connected to the transmission, the system comprising:
a control unit configured to
receive a signal indicative of a desired vehicle speed,
determine a target speed of the output shaft of the torque converter from the signal indicative of the desired vehicle speed,
receive a signal indicative of an actual power plant output speed,
receive a signal indicative of actual speed of the output shaft of the torque converter,
determine a desired power plant output speed based on the signal indicative of actual speed of the output shaft of the torque converter, the target speed of the output shaft of the torque converter, and the signal indicative of the actual power plant output speed,
send a signal to the power plant such that the power plant operates at the desired power plant output speed, and
maintain a desired vehicle speed substantially independent of a magnitude of load on the powertrain.

2. The system of claim 1, further including a speed control configured to manually reduce the power plant output speed.

3. The system of claim 1, wherein the control unit is configured to switch the transmission from a first condition in which the vehicle travels in a forward direction in at least one of a forward gear ratio and a forward speed range to a second condition in which the vehicle travels in a reverse direction in at least one of a reverse gear ratio and a reverse speed range, wherein the control unit is configured such that at least one of the forward gear ratio and the forward speed range may be pre-selected and/or at least one of the reverse gear ratio and the reverse speed range may be pre-selected.

4. The system of claim 1, wherein the control unit includes a power plant control module configured to control the power plant and a powertrain control module configured to control the transmission.

5. The system of claim 1, wherein desired power plant output speed is determined according to the following:

$$\omega_{dpp} = TCOS_{target} \times (\omega_{actual}/TCOS_{actual}),$$

where $\omega_{dpp}$ is the desired power plant output speed, $TCOS_{target}$ is the target speed of the output shaft of the torque converter, $TCOS_{actual}$ is the actual speed of the output shaft of the torque converter, and $\omega_{actual}$ is the actual speed of the power plant.

6. The system of claim 1, wherein the transmission is configured to selectively provide one of a number of gear ratios and the system is configured to determine at least one desired vehicle speed associated with each gear ratio.

7. The system of claim 6, wherein the power plant is operably coupled to the transmission via the torque converter, and the signal indicative of vehicle speed includes the signal indicative of torque converter output speed, and wherein the system is configured to maintain the desired vehicle speed substantially constant by changing the desired power plant output speed responsive to changes in torque converter output speed due to changes in load on the powertrain.

8. The system of claim 6, wherein the control unit is operable to select between at least two modes of operation of the system, and wherein the at least two modes of operation of the system include a first mode in which the number of desired vehicle speeds equals the number of gear ratios and a second mode in which the number of desired vehicle speeds is greater than the number of gear ratios.

9. The system of claim 8, further including a switch configured to manually select between the at least two modes of operation of the system.

10. The system of claim 1, further including a display configured to provide information indicative of a status related to travel of the vehicle, wherein the status related to travel of the vehicle includes at least one of the power plant output speed, a gear ratio provided by the transmission, a direction of travel of the vehicle, and a mode of operation of the system.

11. The system of claim 10, wherein the status related to travel of the vehicle includes the gear ratio provided by the transmission and the mode of operation of the system.

12. The system of claim 11, wherein the display is configured to display the gear ratio provided by the transmission in a manner substantially independent of the mode of operation of the system displayed.

13. The system of claim 1, wherein the system is configured to control the power plant and transmission such that for each gear ratio provided by the transmission, the vehicle travels in at least one speed range that corresponds to the gear ratio.

14. The system of claim 13, wherein the control unit is configured to change the gear ratio upon sensing that the vehicle speed is below the speed range by more than a predetermined amount.

15. The system of claim 13, wherein the control unit is operable to select between at least two modes of operation of the system, and wherein the at least two modes of operation of the system include a first mode in which the number of speed ranges available equals the number of gear ratios provided by the transmission and a second mode in which a number of speed ranges available is greater than the number of gear ratios provided by the transmission.

16. The system of claim 13, wherein the system is configured such that at least one speed range corresponding to at least one gear ratio may be manually preset.

17. A vehicle having a powertrain, the vehicle comprising:
a power plant configured to provide power to the vehicle;
a transmission operably coupled to the power plant via a torque converter, the transmission being configured to transfer the power provided by the power plant to propel the vehicle;
the torque converter including an output shaft connected to the transmission;
driving members configured to propel the vehicle;
a control unit configured to control operation of the power plant and the transmission, the control unit being configured to
receive a signal indicative of a desired vehicle speed,
determine a target speed of the output shaft of the torque converter from the signal indicative of the desired vehicle speed,
receive a signal indicative of an actual power plant output speed,
receive a signal indicative of actual speed of the output shaft of the torque converter,
determine a desired power plant output speed based on the signal indicative of actual speed of the output shaft of the torque converter, the target speed of the output shaft of the torque converter, and the signal indicative of the actual power plant output speed,
send a signal to the power plant such that the power plant operates at the desired power plant output speed, and
maintain a desired vehicle speed substantially independent of a magnitude of load on the powertrain.

18. The vehicle of claim 17, further including a pair of ground engaging tracks operably coupled to the driving members.

19. The vehicle of claim 17, further including a speed control configured to manually reduce the power plant output speed.

20. The vehicle of claim 17, wherein the transmission includes a gear assembly and at least one clutch configured to provide at least one gear ratio.

21. The vehicle of claim 17, wherein the control unit is configured to switch the transmission from a first condition in which the vehicle travels in a forward direction in at least one of a forward gear ratio and a forward speed range to a second condition in which the vehicle travels in a reverse direction in at least one of a reverse gear ratio and a reverse speed range, wherein the control unit is configured such that at least one of the forward gear ratio and the forward speed range may be pre-selected and/or at least one of the reverse gear ratio and the reverse speed range may be pre-selected.

22. The vehicle of claim 17, wherein the control unit includes a power plant control module configured to control the power plant and a powertrain control module configured to control the transmission.

23. The vehicle of claim 17, wherein the transmission is configured to selectively provide one of a number of gear ratios and the control unit is configured to determine at least one desired vehicle speed associated with each gear ratio.

24. The vehicle of claim 23, wherein the control unit is operable to select between at least two modes of operation, and wherein the at least two modes of operation include a first mode in which the number of desired vehicle speeds equals the number of gear ratios and a second mode in which the number of desired vehicle speeds is greater than the number of gear ratios.

25. The vehicle of claim 17, further including a display configured to provide information indicative of a status related to travel of the vehicle, wherein the status related to travel of the vehicle includes at least one of the power plant speed, a gear ratio provided by the transmission, a direction of travel of the vehicle, and a mode of operation.

26. The vehicle of claim 25, wherein the status related to travel of the vehicle includes the gear ratio provided by the transmission and the mode of operation.

27. The vehicle of claim 26, wherein the display is configured to display the gear ratio provided by the transmission substantially independent of the mode of operation displayed.

28. The vehicle of claim 17, wherein the control unit is configured to control the power plant and transmission such that for each gear ratio provided by the transmission, the vehicle travels in at least one speed range that corresponds to the gear ratio.

29. The vehicle of claim 28, wherein the control unit is configured to change the gear ratio upon sensing that the vehicle speed is below the speed range by more than a predetermined amount.

30. The vehicle of claim 28, wherein the control unit is configured such that at least one speed range corresponding to at least one gear ratio may be manually preset.

31. The vehicle of claim 28, wherein the control unit is operable to select between at least two modes of operation, and wherein the at least two modes of operation include a first mode in which the number of speed ranges available equals the number of gear ratios provided by the transmission and a second mode in which a number of speed ranges available is greater than the number of gear ratios provided by the transmission.

32. The vehicle of claim 31, further including a switch configured to manually select between the at least two modes of operation.

33. The vehicle of claim 17, wherein the power plant is an internal combustion engine.

34. The vehicle of claim 33, wherein the power plant is a compression-ignition engine.

35. A method for controlling the speed of a vehicle having a powertrain including a power plant coupled to a transmission via a torque converter, the method comprising:

sensing a signal indicative of vehicle speed;

sensing a signal indicative of power plant output speed;

determining a desired power plant output speed according to the following:

$$\omega_{dpp} = TCOS_{target} \times (\omega_{actual}/TCOS_{actual}),$$

where $\omega_{dpp}$ represents the desired power plant output speed, $TCOS_{target}$ represents a target speed for an output shaft of the torque converter, $TCOS_{actual}$ represents actual speed of the output shaft of the torque converter, and $\omega_{actual}$ represents actual speed of the power plant;

sending a signal to the power plant such that the power plant operates at the desired power plant output speed; and maintaining a desired vehicle speed substantially independent of a magnitude of load on the powertrain.

\* \* \* \* \*